United States Patent
Anderson et al.

(12)

(10) Patent No.: US 6,324,531 B1
(45) Date of Patent: Nov. 27, 2001

(54) SYSTEM AND METHOD FOR IDENTIFYING THE GEOGRAPHIC ORIGIN OF A FRESH COMMODITY

(75) Inventors: Kim A. Anderson; Brian Smith, both of Troy; Bernadene Magnuson, Moscow, all of ID (US)

(73) Assignees: Florida Department of Citrus, Lakeland, FL (US); Idaho Potato Commission, Boise, ID (US)

(*) Notice: Subject to any disclaimer, the term of this patent is extended or adjusted under 35 U.S.C. 154(b) by 0 days.

(21) Appl. No.: 09/210,358

(22) Filed: Dec. 11, 1998

Related U.S. Application Data

(60) Provisional application No. 60/069,036, filed on Dec. 12, 1997.

(51) Int. Cl.[7] .................................................. G06N 3/02
(52) U.S. Cl. ............................... 706/15; 706/16; 382/110; 356/73
(58) Field of Search ........................ 706/15, 16; 700/223; 382/110; 356/73

(56) References Cited

U.S. PATENT DOCUMENTS

| | | |
|---|---|---|
| 4,550,082 | 10/1985 | Martin et al. . |
| 5,659,624 | * 8/1997 | Fazzari et al. ........................ 382/110 |
| 5,761,070 | * 6/1998 | Conners et al. ...................... 700/223 |
| 5,917,927 | * 6/1999 | Satake et al. ........................ 382/110 |
| 6,122,042 | * 9/2000 | Wunderman et al. ................. 356/73 |

OTHER PUBLICATIONS

Hahn, F.; Muir, A.Y., Neural networks for crop/weed discrimination in different cabbage trials, Signal Processing, 1996., 3rd International Conference on, vol.: 2, Oct. 14–18, 1996, pp.: 1445–1448 vol. 2.*

Stark, E.; Eltoft, T.; Braathen, B., Performance of vegetation classification methods using synthetic multispectral satellite data, Geoscience and Remote Sensing Symposium, 1995. IGARSS '95. 'Quantitative Remote Sensing for Science and Applications', Inte, Jul. 1995.*

A. K. Jain, M. N. Murty and P. J. Flynn; Data clustering: a review; ACM Comput. Surv. 31, 3 (Sep. 1999), pp. 264–323., Oct. 1996.*

Seifollah Nikel Et Al., Trace Metals: Defining Geographical Origin and Detecting Adulteration of Orange Juice, Adulteration of Fruit Juice Beverages, Marcel Dekker, Inc., 1988, pp. 81–105.

Judy Curlee, To Sell The Truth, Food Quality, Apr. 1998, pp. 32–35.

Jo Rita Jordan, Detecting the Geographical Origins of Foods, Inside Laboratory Management, May 1998, pp. 10–12.

* cited by examiner

Primary Examiner—Mark R. Powell
Assistant Examiner—Wilbert L. Starks, Jr.
(74) Attorney, Agent, or Firm—Allen, Dyer, Doppelt, Milbrath & Gilchrist, P.A.

(57) ABSTRACT

The detection method includes generating a plurality of neural network models. Each model has as a training set a data set from a plurality of samples of a commodity of known origins. Each sample has been analyzed for a plurality of elemental concentrations. Each neural network model is presented for classification a test data set from a plurality of samples of a commodity of unknown origins. As with the training set, the samples have been analyzed for the same plurality of elemental concentrations. Next a bootstrap aggregating strategy is employed to combine the results of the classifications for each sample in the test data set made by each neural network model. Finally, a determination is made from the bootstrap aggregating strategy as to a final classification of each sample in the test data set. This final classification is indicative of the geographical origin of the commodity. The system includes software for generating the neural network models and a software routine for performing the bootstrap aggregating strategy.

25 Claims, 9 Drawing Sheets

SYSTEM AND METHOD FOR IDENTIFYING THE GEOGRAPHIC ORIGIN OF A FRESH COMMODITY

CROSS-REFERENCE TO RELATED APPLICATION

This application claims priority from provisional application 60/069,036, "System and Method for Identifying Geographic Origin of Fresh Commodities Using Trace Element Analysis," filed Dec. 12, 1997.

BACKGROUND OF THE INVENTION

1. Field of the Invention

The present invention relates to systems and methods for analyzing a fresh commodity, and, more particularly, to such systems and methods for identifying the geographic origin thereof.

2. Description of Related Art

Fresh produce is often labeled with its geographical origin when that origin is believed to confer a beneficial attribute. Such indicators include "Vidalia onions," "Idaho potatoes," and "Florida citrus." Federal and state laws have been enacted to ban mislabeling of fresh produce, and cases of alleged misrepresentation have been investigated by the U.S. Department. of Agriculture, state governments, and grower groups.

One detection method involves the analysis of vitamin or other organic molecules. Such compounds are, however, subject to variability owing to degradation over time and to storage conditions.

Another way that has been used is to test for the concentration of certain elements in a product, which can be affected by such things as the soil in which the product is grown. The soil-plant system is highly specific for different elements, plant species, and environmental conditions. Under most conditions, a trace element present in the commodity must have existed in the rooting zone of the plant, generally in highly soluble form. A trace element must also pass through at least one cellular membrane in its movement from soil to plant. The selectivity of these processes of mineral accumulation within the commodity varies with different trace elements, with different plants, and the unique environment in which the commodity is grown.

An example of geographic origin variability is the higher barium levels typically found in Brazilian than in Florida oranges;, which can thus be used as an indicator of adulteration. The use of trace metals to define geographical origin of orange juice has been described using inductively coupled plasma—atomic emission spectrometry (ICP-AES) data subjected to a multivariate pattern recognition algorithm and artificial neural networks (Nikdel et al., in Nagy et al., *Adulteration of Fruit Juice Beverages*, Marciel Dekker, New York, 1988; Nikdel, in Nagy et al., *Methods to Detect Adulteration of Fruit Juice Beverages*, Vol. I, Agscience, Inc., Auburndale, Fla., 1995).

SUMMARY OF THE INVENTION

It is therefore an object of the present invention to provide a system and method for detecting a geographical origin of a fresh commodity.

It is a further object to provide such a system and method that utilize elemental analysis.

It is another object to provide such a system and method that utilize statistical computational and neural network methods to analyze the elemental data.

It is an additional object to provide such a system and method for detecting adulteration of a commodity.

It is yet a further object to provide such a system and method for detecting a mislabeling of a commodity.

It is yet another object to provide such a system and method for determining the geographic origin of a potato.

These and other objects are achieved by the present invention, a system and method for detecting a geographical origin of a fresh commodity. The method comprises a series of steps, including generating a plurality of neural network models. Each model has as a training set a data set from a plurality of samples of a commodity of known origins. Each sample has been analyzed for a plurality of elemental concentrations.

Each neural network model is presented for classification a test data set from a plurality of samples of a commodity of unknown origins. As with the training set, the samples have been analyzed for the same plurality of elemental concentrations.

Next a bootstrap aggregating strategy is employed to combine the results of the classifications for each sample in the test data set made by each neural network model. Finally, a determination is made from the bootstrap aggregating strategy as to a final classification of each sample in the test data set. This final classification is indicative of the geographical origin of the commodity.

The system of the present invention includes means for performing the above-recited steps, comprising software means for generating the neural network models and a software routine for performing the bootstrap aggregating strategy.

The features that characterize the invention, both as to organization and method of operation, together with further objects and advantages thereof, will be better understood from the is following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
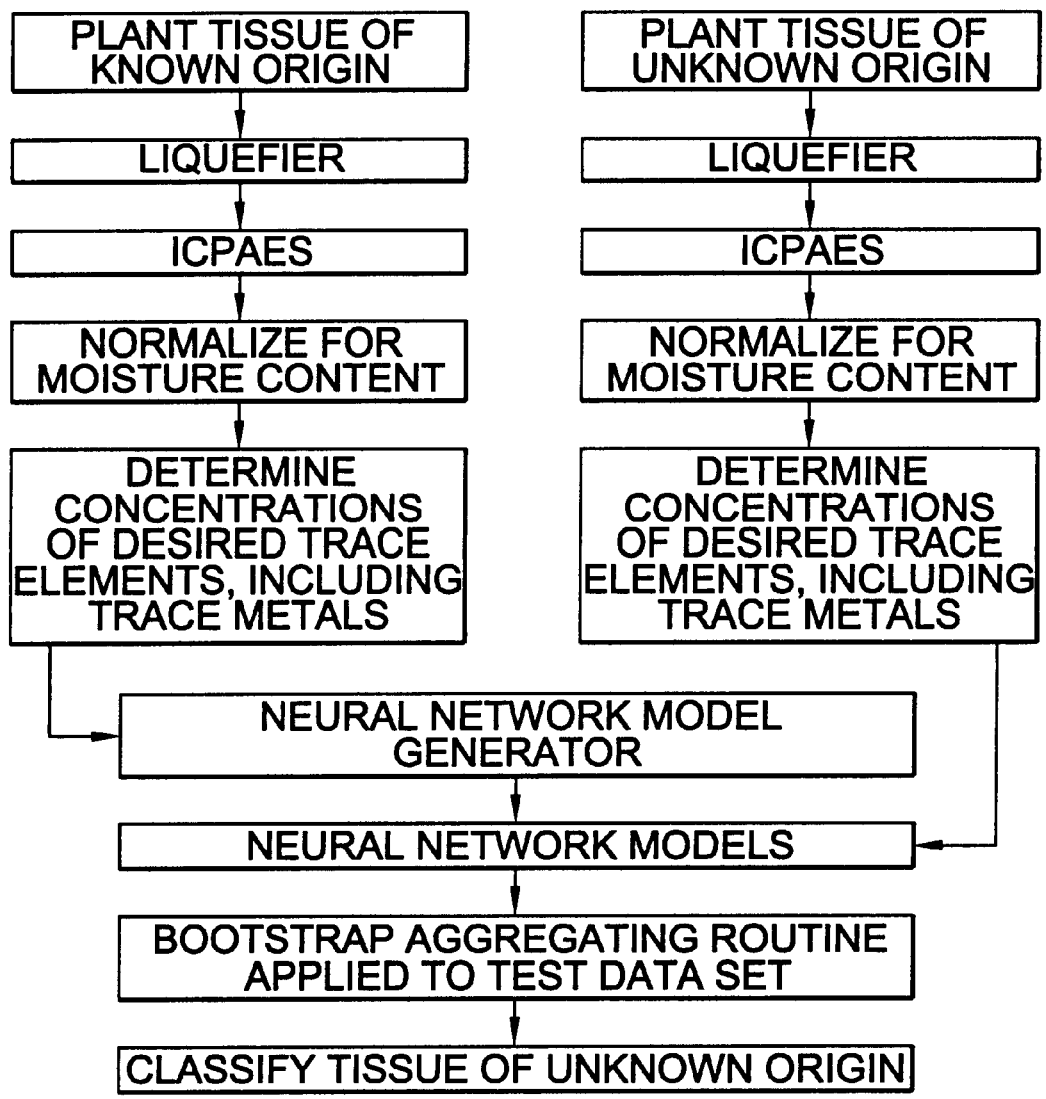
FIG. 1 is a flow chart of a preferred embodiment of the method of the present invention.
Figure 2:
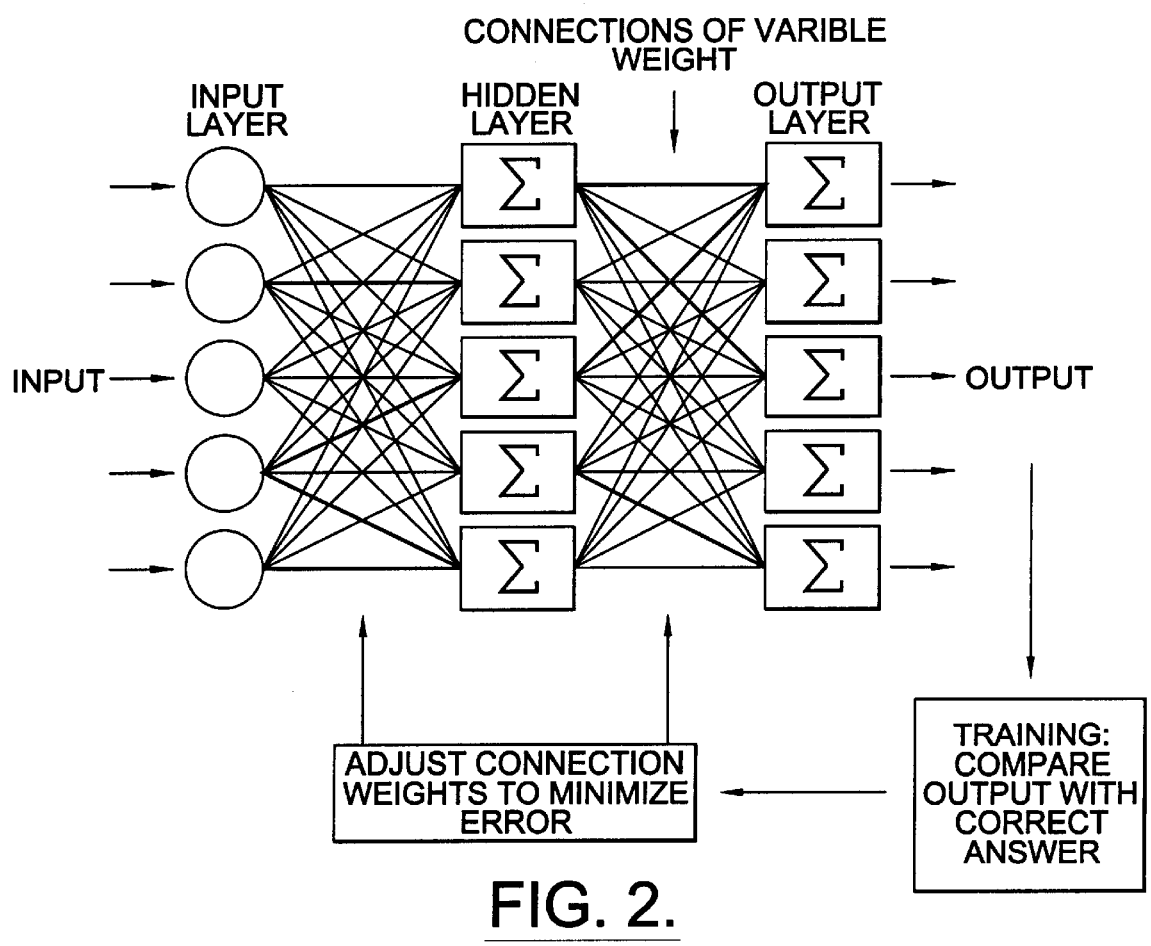
FIG. 2 (prior art) is a schematic diagram of the back propagation of neural networks.
Figure 3:
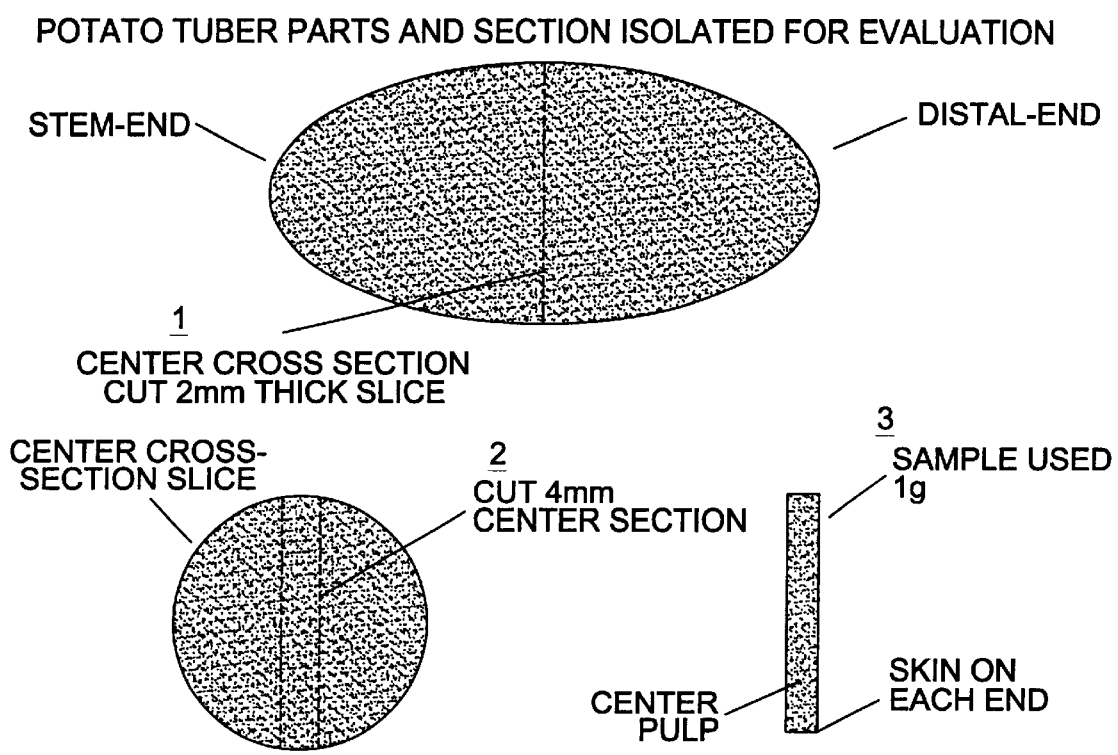
FIG. 3 is a schematic diagram of potato tuber parts and sections used for trace element analysis.
Figure 4:
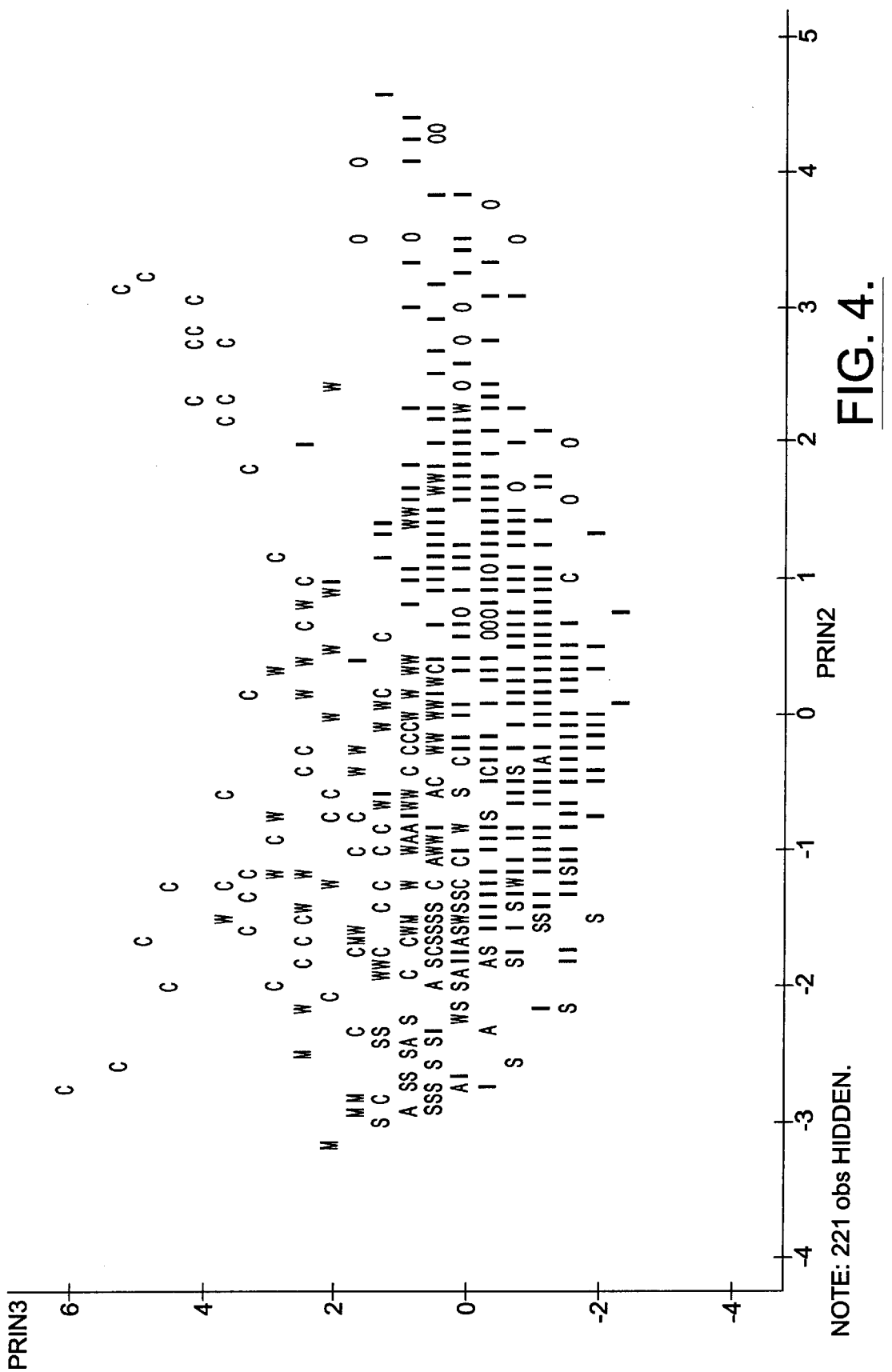
FIG. 4 is a 2D plot of principal components.

A description of the preferred embodiments of the present invention will now be presented with reference to FIGS. 1–9.

I. Analytical Procedure

Apparatus

An inductively coupled argon plasma atomic emission spectrometer (ICPAES) was equipped and set up as follows: Leeman 1000, power 1.9 kW, coolant 13 LPM, nebulizer 46 psi, aux. flow 0.20, pump rate 0.9 mL/min, scan integration time 0.25 sec, integrations 2, uptake time 29 sec, Mn1 peaking wavelength, acid flexible tubing 0.030 ID mm, wavelengths and background correctors given in Anderson (1996). The temperature controller/digester used was a digestion system 40, 1016 Digester, and Autostep 1012 Controller (Tecator, Sweden), fitted with an aluminum adapter plate 3-mm thick with 40 17-mm holes on top overlaid on the heater block.

Reagents

The source of chemicals and reference materials was as follows: concentrated, nitric acid trace metal analysis grade (J. T. Baker, St. Louis, Mo.); elemental stock standards solutions (J. T. Baker, St. Louis, Mo.); reference materials, NIST 1575 Pine Needles, NIST Oyster Tissue 1566a, NIST Rice Flour 1568a, NIST 1577b Bovine Liver, NIST 8433 Corn Bran (National Institute of Standards and Technology, Gaithersburg, Md.), NRC, TORT-2 Lobster Hepatopancreas (National Research Council Canada, Institute National Measurements Standards).

Experimental Procedure

Sampling, Preparation, and Analysis: In order to ensure that we used only authentic samples with precisely known origin, samples were gathered by the Idaho Potato Commission (IPC) or one of their delegates directly from farms or producer's storage units. Samples were shipped within days of collection with the chain-of-custody documentation to the University of Idaho Analytical Sciences Laboratory. Samples were stored under controlled access at 40° C. until analysis, typically within two weeks.

Potatoes were collected from all major fresh market geographic locations in North America (US and Canada), based primarily on the number of acres in fresh potato production. Idaho potatoes are grown primarily in the Snake River Plain, representing about 400,000 acres in current potato production. Within this region, sub-regions were identified and three hundred forty-two samples were collected from the following Idaho locations: Upper Valley, Magic Valley, and Treasure Valley. Non-Idaho potatoes include samples taken from the following geographic locations: Colorado, Washington, Maine, Michigan, and Canada (Prince Edward Island and New Brunswick). Two hundred sixty-six non-Idaho samples were collected.

Each tuber was hand rinsed under a stream of tap water for 20–30 seconds. Dirt was removed by gently rubbing by hand under the water stream. After rinsing, the tubers were shaken to remove any excess water, gently blotted with a paper towel and placed in a lab mat covered tub to air dry prior to processing (1–2 hours). A ca. 1.0 g cross-sectional slice of whole tuber was taken (see FIG. 3) and the same was digested with 3.0 mL nitric acid (trace metal grade) in a 10 mL graduated Kimax culture tube on a programmed heating block. Similarly a ca. 1 g sample of pulp only was taken from each potato as a cross-sectional slice and a 1–3 mm thick slice of peel was taken. These three samples represented the whole tuber, pulp only and peel only sub-samples respectively.

The samples were allowed to react for ca. 4–8 hours in a hood at ambient temperature. Then the samples were digested using a heating block (or programmable digester may be used). The samples were heated to 180 C. for 3–4 hours. Digestion is confirmed complete when no nitrous oxide gases are evolved (i.e., orange gas production). Samples are diluted with type 1 water (18 Mohm cm) and mixed thoroughly using a vortexer. Analysis is by inductively coupled plasma atomic emission spectrometer (ICPAES).

Percent moisture for each individual sample was determined in duplicate. The percent moisture method used was a modification of AOAC Method 984.25 (Association of Official Analytical Chemists, 1990). Mineral and trace element concentrations were standardized to a dry weight, based on the moisture content.

Quality Control: Each analytical batch contained a minimum of 25% quality control samples, including check standards, duplicates, spikes, and standard reference materials (SRM). Percent recovery and percent standard deviation for SRM are given in Table 1.

TABLE 1

Recovery and Standard Deviations of 7 Different Standard Reference Materials Used During the Study

| Element | Oyster Tissue[1] % Rec | Pine Needle[2] % Rec | Rice Flour[3] % Rec | Lobster[4] % Rec | Corn Bran[5] % Rec | Alfalfa[6] % Rec | Bovine Liver[7] % Rec |
|---|---|---|---|---|---|---|---|
| Ba | N/A | N/A | N/A | N/A | 96.1 | N/A | N/A |
| Ca | 101.4 | 105.3 | 112.1 | N/A | 106.1 | 99.2 | 113.2 |
| Cd | 115 | N/A | N/A | 116.1 | N/A | N/A | 99.3 |
| Co | BDL | N/A | N/A | 112.3 | N/A | N/A | N/A |
| Cr | N/A | 102.8 | N/A | N/A | N/A | 113.5 | N/A |
| Cu | 102.8 | 115.0 | 112.8 | 95.0 | 115.0 | 104.4 | 106.9 |
| Fe | 95.1 | 86.2 | 89.5 | 94.9 | 92.1 | 97.5 | 108.9 |
| K | 102.7 | 105.1 | 104.7 | N/A | 107.6 | 109.4 | 105.7 |
| Mg | 103.6 | N/A | 97.1 | N/A | 107.8 | 96.4 | 116.4 |
| Mn | BDL | 102.3 | 99.7 | 84.7 | 85.0 | N/A | 85.7 |
| Mo | N/A | N/A | 136.4 | 114.4 | N/A | N/A | 116.2 |
| Ni | 123.9 | N/A | N/A | 101.6 | N/A | N/A | N/A |
| P | 103.4 | 108.9 | 112.3 | N/A | 103.9 | 104.5 | 120.5 |
| Pb | N/A | 116.4 | N/A | N/A | N/A | N/A | N/A |
| S | 104.0 | N/A | 104.0 | N/A | 102.3 | 108.2 | 106.6 |

TABLE 1-continued

Recovery and Standard Deviations of 7 Different Standard Reference Materials Used During the Study

| Element | Oyster Tissue[1] % Rec | Pine Needle[2] % Rec | Rice Flour[3] % Rec | Lobster[4] % Rec | Corn Bran[5] % Rec | Alfalfa[6] % Rec | Bovine Liver[7] % Rec |
| --- | --- | --- | --- | --- | --- | --- | --- |
| V | 123.5 | N/A | N/A | 103.7 | N/A | N/A | N/A |
| Zn | 105.4 | N/A | 108.3 | 105.3 | 104.0 | 104.5 | 107.6 |

N/A = certified value Not Available
BDL = Below Detection Limit
% Rec = Percentage Recovery
% SD = Percentage Standard Deviation, reference values not available for strontium.
[1]n = 72, NIST SRM 1566a Oyster Tissue, % SD ranged from 7.9% to 9.8%, Ni is near MDL and % SD was >10%
[2]n = 95, NIST SRM 1575 Pine Needles, % SD ranged from 8–22%
[3]n = 90, NIST SRM 1568a Rice Flour, % SD ranged from 7–22%
[4]n = 8, CRC TORT2 Lobster Hepatopancreas, % SD ranged from 2–22%, Mo is near MDL and % SD was >10%
[5]n = 84, NIST, SRM 8433 Corn Bran, % SD ranged from 10.3–23%
[6]n = 12, House SRM Alfalfa, % SD ranged from 3.5–12%
[7]n = 3, NIST SRM 1577a Bovine Liver, % SD ranged from 1–5%

During the course of the study over 360 SRM samples were analyzed; SRM were dominantly plant matrices where available. In all cases the SRM represented analyte concentration ranges typically found in plant tissues. The percent recovery ranged from 86 to 136%. The percent standard deviation ranged from 2 to 39%. Typical percent. standard deviation (% SD) was <10%, although analytes close to method detection limits (MDL) had higher % SD. Spike recoveries and check standards were typically within ±10% of their true value.

Chemical Analysis

There are several unique aspects to optimizing a set of chemical measurements that can be used to determine geographic origin of fresh commodities. This includes the determination of the most appropriate portion of the commodity to test; determination of factors that might mask or dominate over subtle trends; as well as determination of the most applicable set of chemical measurements to be made on the sample of choice.

Fresh commodities may be stored for long periods (1–9 months); during storage fresh produce may lose moisture. For example, in a study on walnuts and storage influence, the authors proposed that even at 4° C. (3 months) desiccation of the walnuts occurred (Lavedrine et al., 1997). In the case of potato tubers, the percentage water may vary 10–20% from the time of harvest to the time of use (1–9 months later). Percent moisture content will affect the relative concentration of trace elements (e.g., weight/weight). Therefore, the percentage moisture must be equalized such that it does not dominate or mask the variations of the elemental concentrations, which are due to geographic growing conditions of fresh commodities versus effects of dehydration during storage. The potato tuber was not dried prior to sub-sampling due to the difficulty in sub-sampling a portion that had a consistent pulp/skin ratio (see below). Desiccation by freeze-drying would be an alternative method. Here the percent moisture was determined (in duplicate) for each individual tuber. The percent moisture was then used to determine the elemental concentrations on a dry weight basis for each individual tuber. In this way, the loss or variation of water would not mask the variations that are due to geographic growing conditions. The procedure developed here was tested with samples over 4 months are found that when the percent moisture was compensated for, the elemental concentrations were consistent regardless of storage time. This method therefore is robust in its applicability independent of storage time.

It has been reported that elemental distribution in a fresh commodity is different for different parts of the commodity (Esechie, 1992). For example, the concentration of various elements within a potato will be different in the skin versus the pulp. One of the inventors has found that some elements may be concentrated in the potato skin relative to the potato pulp. In addition, some elements in the skin may be an enhanced (or distorted) reflection of geographic conditions. However, the pulp, which represents the largest portion by weight of the commodity, may have unique elemental distribution tendencies relative to other portions of the commodity. Therefore, the challenge is to analyze sample components that maximize the effects of geographical conditions and yet are reasonable to prepare for analytical determination.

Three sample component parts for the potato commodity were analyzed: skin only, pulp only, and whole tuber. A preliminary data analysis using 70 samples (computational modeling) was used to screen the viability of each sample component part. In addition, practical aspects such as the reliability and consistency that could be achieved at the bench-level during sample preparation for the chemical analysis were evaluated. The most optimal sample component type was determined to be whole tuber. However, an important caveat of this sample type was the importance of the ratio of skin to pulp. It was determined that the skin to pulp ratio (by weight) should be consistent between all samples. A protocol was developed that provided a method to sub-sample from the tuber that could consistently represent the same pulp/skin ratio (see FIG. 3).

Elemental distribution within a single commodity component (e.g., pulp only) may vary within the commodity itself. For example, there is evidence that some chemicals within a potato tuber are not evenly distributed in a given potato component (i.e., the pulp) from the stem end to the distal end (Al-Saikhan et al., 1995). Here we developed a protocol that isolated a consistent. potato tuber section. The center section was determined to be the least affected by any variations that might exist between the stern end and the distal end. See FIG. 3 for a graphical representation of the sampling technique developed.

The drying of a plant tissue is a balancing act between too low a temperature over a prolonged period, which will encourage and promote biological activity, and too high a temperature over a short period, which may result in the loss of volatile analytes. We performed a 10 day study (n=3) of drying times versus temperatures. After 5 days the percentage moisture at 105° C. changed by less than 0.2% on average. Lower temperatures (<85° C.) required longer drying times (>7–8 days), which risked biological growth, and temperatures >105° C. were determined to increase the risk of other volatile analytes losses. The above-described procedure therefore was determined to be optimal for fresh commodities by minimizing any volatilization and producing a consistent dried weight while avoiding biological growth.

An important attribute of this approach is that all the chemical data can be determined with the use of only a single analytical instrument, the ICPAES. Whereas other geographic authenticity approaches require the use of several instruments and sophisticated approaches to data analysis, this technique requires only a single, commonly available instrument. In this approach the data are used directly from the ICPAES into the computational models, requiring no prior mathematical or interpretive analyses as is often the case with other geographic authenticity approaches.

The Idaho Snake River Plain is a unique area composed of rich volcanic soil in an arid to semi-arid (irrigated) environment. The soils in this region are Xerolls, which are unique as compared to other potato producing geographic regions. The soil and environmental growing conditions provide unique mineral and trace element tuber uptake and the necessary chemical profile difference to differentiate between potatoes grown in Idaho versus outside Idaho.

II. Computational Analysis

The data were analyzed in an effort to classify potato samples as having originated from Idaho or from outside Idaho based on the trace element profile of each sample. Basic statistical analyses and several pattern recognition methods were applied to the data. Neural network methods were applied utilizing software from the Ward Systems Group (NeuroShell, Release 4.6). Basic statistical analyses and pattern recognition techniques (not including neural network) were performed utilizing the SAS System for Windows analysis package (Release 6.11, SAS Institute Inc.). Neural network analysis included variants of feed forward back propagation architectures and included combining classifiers in a "bagging" strategy. Basic statistical analyses and pattern recognition techniques included the following: descriptive statistics, Students t test, assessment of normality of data distribution, principal component analysis, canonical discriminant analysis, discriminate function analysis, nonparametric K nearest-neighbor analysis. The data set was standardized to account for differing variable scales by subtracting from each entry its associated variable mean and then dividing by the variable standard deviation. The standardized data corresponding to each variable thus have a mean equal to zero and a standard deviation equal to one.

Descriptive Statistics

Descriptive statistics (the mean, standard deviation, minimum and maximum values) for each element in each group were determined. The TTEST procedure was used to compute a t statistic for testing the hypothesis that the means of the elemental concentration of the two groups of potatoes are equal. The UNIVARIATE procedure was used to test for normality using the Shapiro-Wilk statistic and data distribution plots. Small values of W lead to the rejection of the null hypothesis.

The means, standard deviation, minimum and maximum values for elemental content of potatoes from Idaho and non-Idaho locations are shown in Table 2. Idaho potatoes had higher concentrations of Ca, Cd, Mg, Ni, Pb, S, and Sr compared to non-Idaho potatoes, whereas the concentrations of Ba, Cr, Cu, Fe, Mn, and Zn were lower in Idaho compared to non-Idaho potatoes. The concentrations of Co, K, Mo, P, and V in the two groups were not significantly different. Despite these differences, examination of the minimum and maximum values illustrate that there was not a single element that could correctly classify the potato samples as to location, as the range., of concentration for each group overlapped for every element. Therefore, multivariate classification techniques were examined.

TABLE 2

Elemental Analysis of Idaho and Non-Idaho Potatoes

| Element | Location | N | Mean | Std Dev | Minimum | Maximum | P Value |
|---|---|---|---|---|---|---|---|
| Ba | Idaho | 342 | 1.43 | 0.63 | 0 | 3.66 | 0.000 |
|    | Non-Idaho | 266 | 1.78 | 1.72 | 0 | 7.61 |  |
| Ca | Idaho | 342 | 532.7 | 164.0 | 197.1 | 1172.2 | 0.000 |
|    | Non-Idaho | 266 | 357.5 | 184.3 | 100.1 | 1163.7 |  |
| Cd | Idaho | 342 | 0.33 | 0.33 | 0 | 1.52 | 0.004 |
|    | Non-Idaho | 263 | 0.25 | 0.35 | 0 | 1.48 |  |
| Cr | Idaho | 342 | 0.38 | 0.48 | 0 | 2.7 | 0.000 |
|    | Non-Idaho | 266 | 0.73 | 0.63 | 0 | 2.12 |  |
| Co | Idaho | 342 | 0.44 | 0.68 | 0 | 2.96 | 0.933 |
|    | Non-Idaho | 266 | 0.43 | 0.78 | 0 | 3.28 |  |
| Cu | Idaho | 342 | 4.26 | 1.47 | 0 | 8.54 | 0.000 |
|    | Non-Idaho | 266 | 5.60 | 2.76 | 0 | 18.15 |  |
| Fe | Idaho | 342 | 34.95 | 13.7 | 12.93 | 90.83 | 0.000 |
|    | Non-Idaho | 266 | 40.58 | 17.70 | 11.71 | 131.05 |  |
| K  | Idaho | 342 | 20902.7 | 3370.7 | 10281.9 | 32770.4 | 0.167 |
|    | Non-Idaho | 266 | 21259.6 | 2866.0 | 13587.7 | 31277.1 |  |
| Mg | Idaho | 342 | 1204.6 | 190.0 | 766.2 | 2015.2 | 0.013 |
|    | Non-Idaho | 266 | 1166.0 | 191.9 | 732.5 | 1858.5 |  |
| Mn | Idaho | 342 | 6.85 | 1.74 | 1.61 | 18.69 | 0.000 |
|    | Non-Idaho | 266 | 10.43 | 5.03 | 1.46 | 35.25 |  |
| Mo | Idaho | 342 | 0.38 | 0.82 | 0 | 3.47 | 0.217 |
|    | Non-Idaho | 266 | 0.47 | 0.99 | 0 | 5.07 |  |
| Ni | Idaho | 342 | 1.03 | 1.01 | 0 | 4.35 | 0.011 |
|    | Non-Idaho | 266 | 0.8 | 1.33 | 0 | 4.98 |  |
| P  | Idaho | 342 | 2506.4 | 686.8 | 1173.0 | 5135.0 | 0.144 |
|    | Non-Idaho | 266 | 2585.0 | 681.7 | 1252.0 | 4424.4 |  |
| Pb | Idaho | 342 | 2.09 | 2.68 | 0 | 10.12 | 0.007 |
|    | Non-Idaho | 266 | 1.49 | 2.87 | 0 | 12.83 |  |
| S  | Idaho | 342 | 1675.8 | 322.2 | 1049.6 | 4020.5 | 0.000 |
|    | Non-Idaho | 266 | 1562.4 | 310.1 | 919.5 | 2530.8 |  |
| Sr | Idaho | 342 | 2.38 | 1.26 | 0 | 6.08 | 0.000 |
|    | Non-Idaho | 266 | 1.59 | 1.81 | 0 | 9.89 |  |
| V  | Idaho | 342 | 1.29 | 1.12 | 0 | 4.32 | 0.106 |
|    | Non-Idaho | 266 | 1.12 | 1.57 | 0 | 7.1 |  |
| Zn | Idaho | 342 | 12.58 | 3.4 | 3.95 | 23.48 | 0.000 |
|    | Non-Idaho | 266 | 17.79 | 4.83 | 6.54 | 58.18 |  |

Tests for Normality

The concentrations of several elements in the potato samples were very close to the detection limit of the chemical analysis method. For the purposes of statistical analyses, any value that was below the detection limit was set to a value of zero. This resulted in highly non-normal distributions (W less than 0.8) for Co, Mo, and Pb. These variables were subsequently eliminated from parametric analyses (PCA and discriminant function). Cr, Ni, and V were also somewhat non-normal, with W less than 0.9. Each of these variables was systematically tested for contribution to the parametric discriminant function analysis, as described below.

Principal Component Analysis

Principal component analysis (PCA) generates principal components that are linear combinations of the original variables. The first principal component (PC) describes the maximum possible variation that can be projected onto one dimension, the second PC captures the second most, and so on. The principal components are orthogonal in the original space of variables and the number of principal components can equal the number of original variables. Analyzing the data with respect to principal components can thus sometimes effectively reduce the number of variables, especially if a large percentage of the total variation is described by a few principal components. One- or two-dimensional plots of data with respect to selected principal components can sometimes provide visual insight into the data, offering a visual description of group differences or clustering, and outliners. PCA has been applied to geographical classification applications of various foods, including processed orange juice (Nikdel et al., 1988), wine (Day et al., 1995; Latorre, et al., 1994), honey (Sanz et al., 1995), and cocoa (Hernandez and Rutledge, 1994a,b). PCA was applied to our data using the PRINCCOMP procedure.

PCA demonstrated that a small number of variables did not dominate total variability, as the first three principal components accounted for only 49% of total variability (Table 3). Some visual clustering by location was observed, though better results were obtained using CDS (see below), since the CDA method optimizes between-class views. A two-dimensional plot of the data using the second and third principal components appear in FIG. 4.

TABLE 3

Principal Component Analysis of Elemental Analysis of Potatoes

|  | Eigenvalue | Proportion | Cumulative |
| --- | --- | --- | --- |
| Principal Component 1 | 2.701 | 0.1931 | 0.1931 |
| Principal Component 2 | 2.378 | 0.1698 | 0.3630 |
| Principal Component 3 | 1.779 | 0.1271 | 0.4901 |
| Principal Component 4 | 1.314 | 0.0938 | 0.5839 |
| Principal Component 5 | 1.043 | 0.0744 | 0.6584 |

Canonical Discriminate Analysis

Canonical discriminate analysis (CDA) generates canonical variables, which are linear combinations of the original variables, that describe the variation between pre-specified classes in a manner analogous to the way in which PCA summarizes the total variation of the data. Like PCA, CDA can be used to effectively reduce the number of variables and is particularly useful for producing one- or two-dimensional visualizations of the data since the "views" optimize the between-class differences. The default number of canonical variables generated is the minimum of the number of classes minus one, and the number of original variables. Different views of our data were obtained by defining the number c,f classes to be two (Idaho vs. non-Idaho) as well as multiple classes defined by different states. CDA has been applied to data for the purpose of geographical classification of wine (Latorre et al., 1994). The SAS procedure used for our analysis was the CANDISC procedure.

Figure 5:
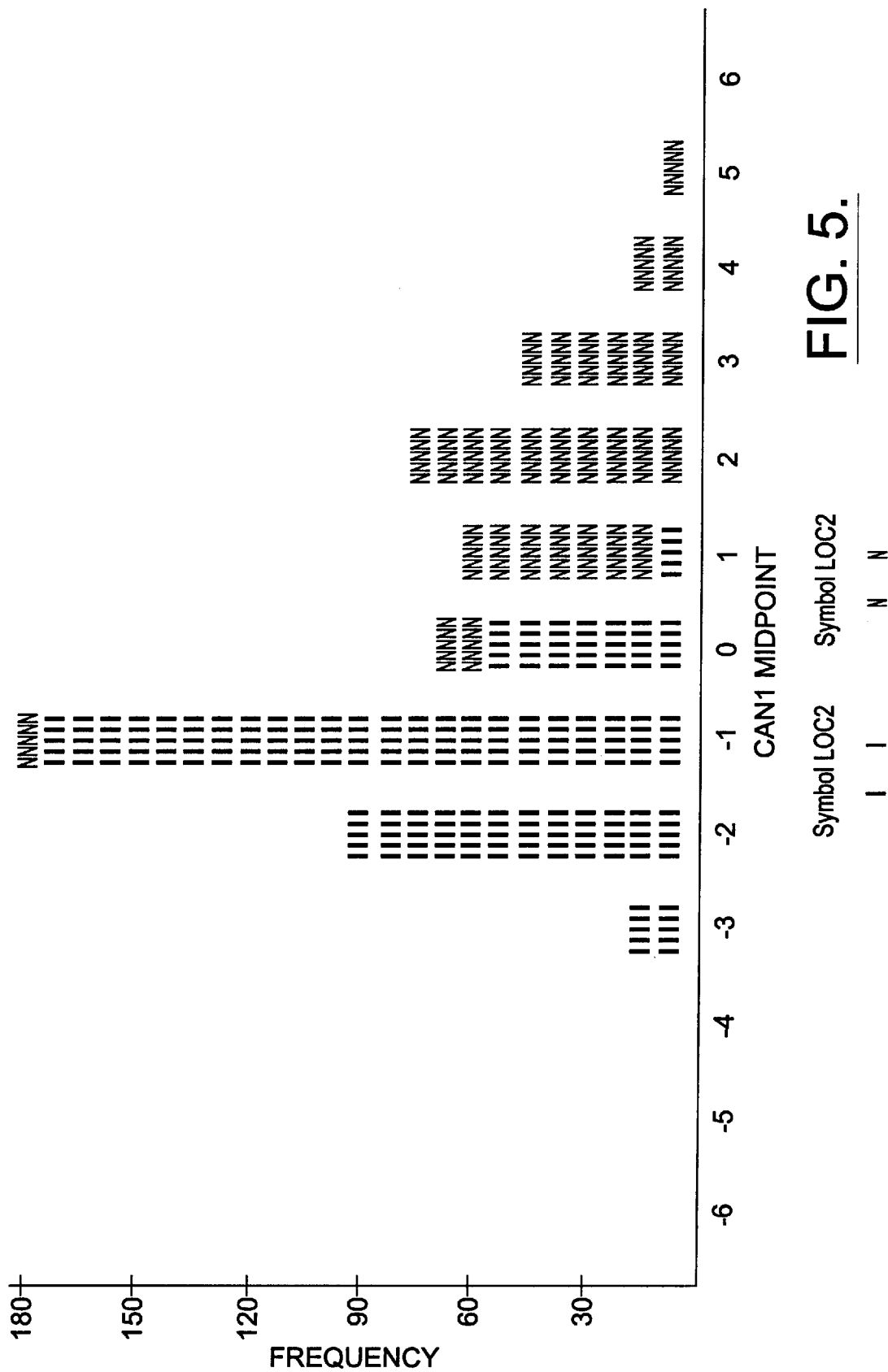
FIG. 5 is a frequency chart of canonical discriminant analysis data.
Figure 6:
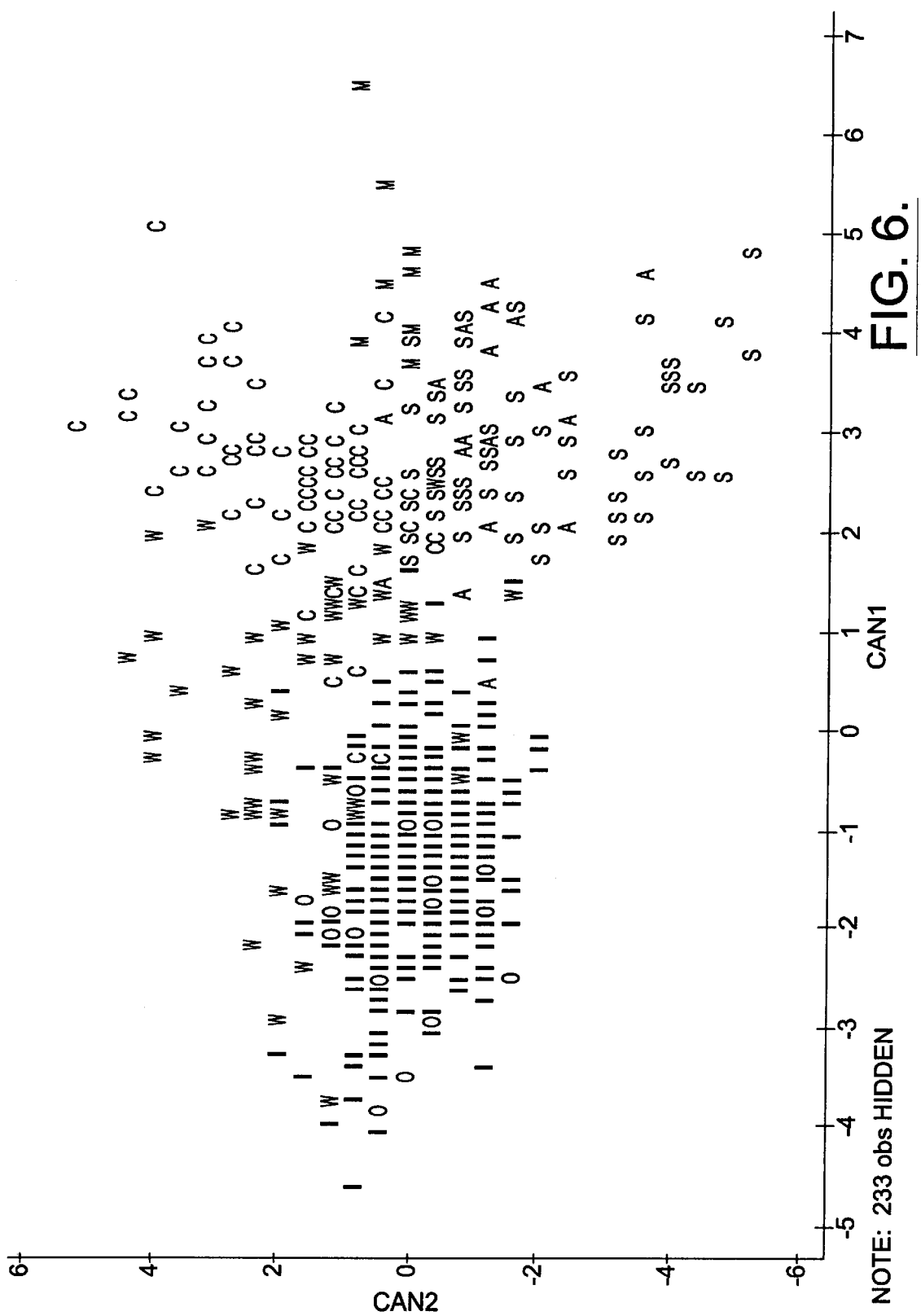
FIG. 6 is a 2D projection of canonical discriminant analysis data.
Figure 7:
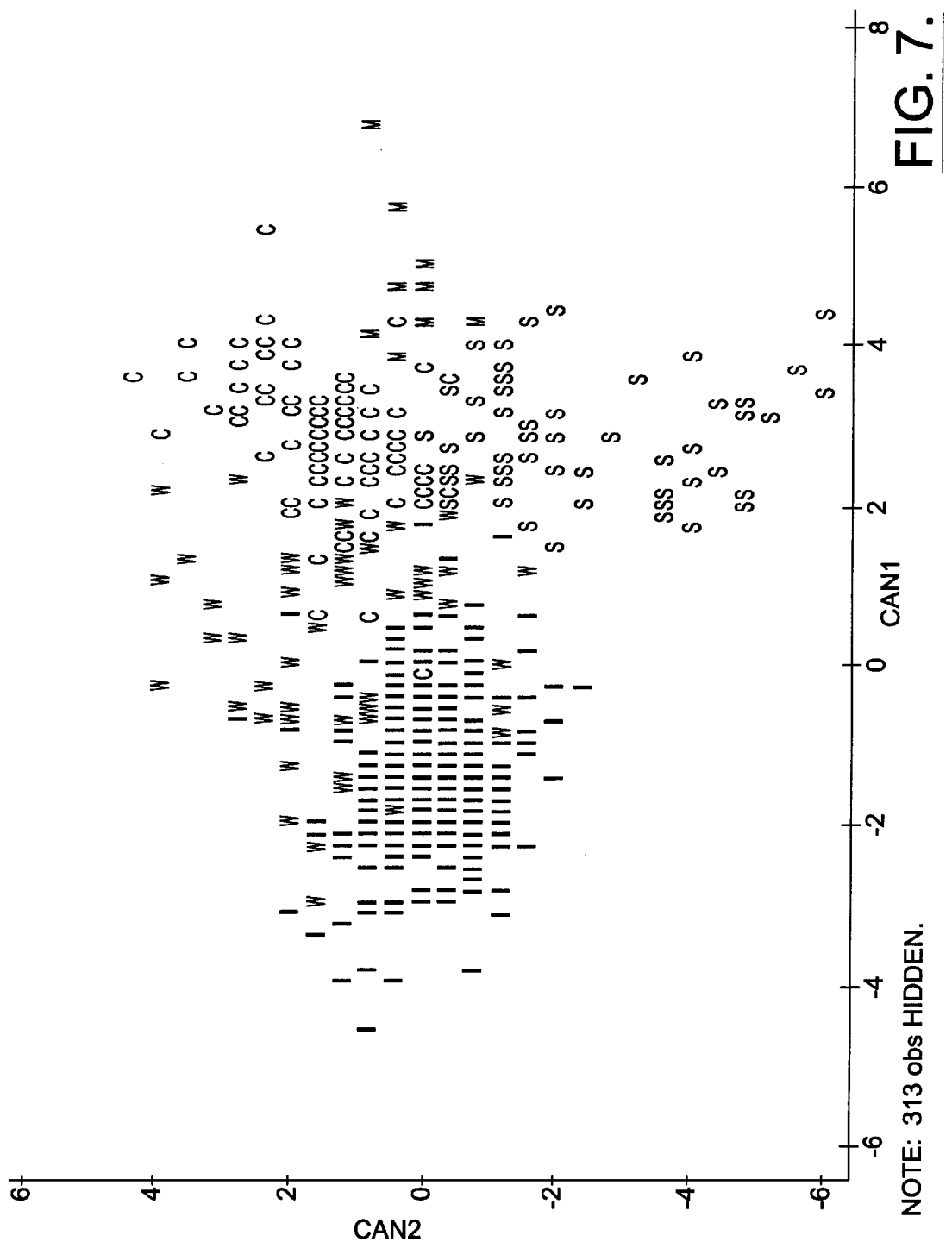
FIG. 7 plots a subset of the data of FIG. 6.
Figure 8:
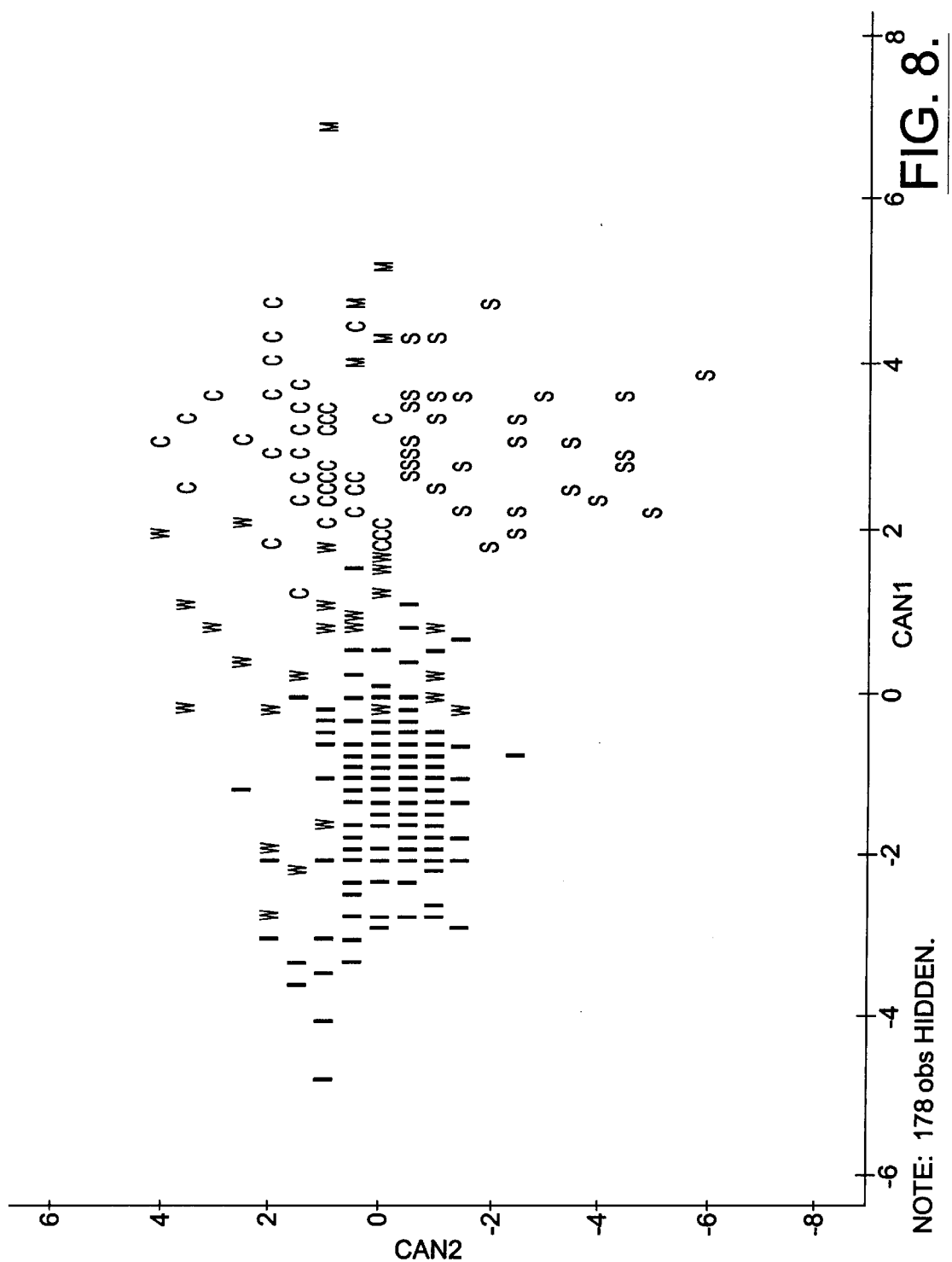
FIG. 8 plots canonical variables generated by half of the data of FIG. 6.
Figure 9:
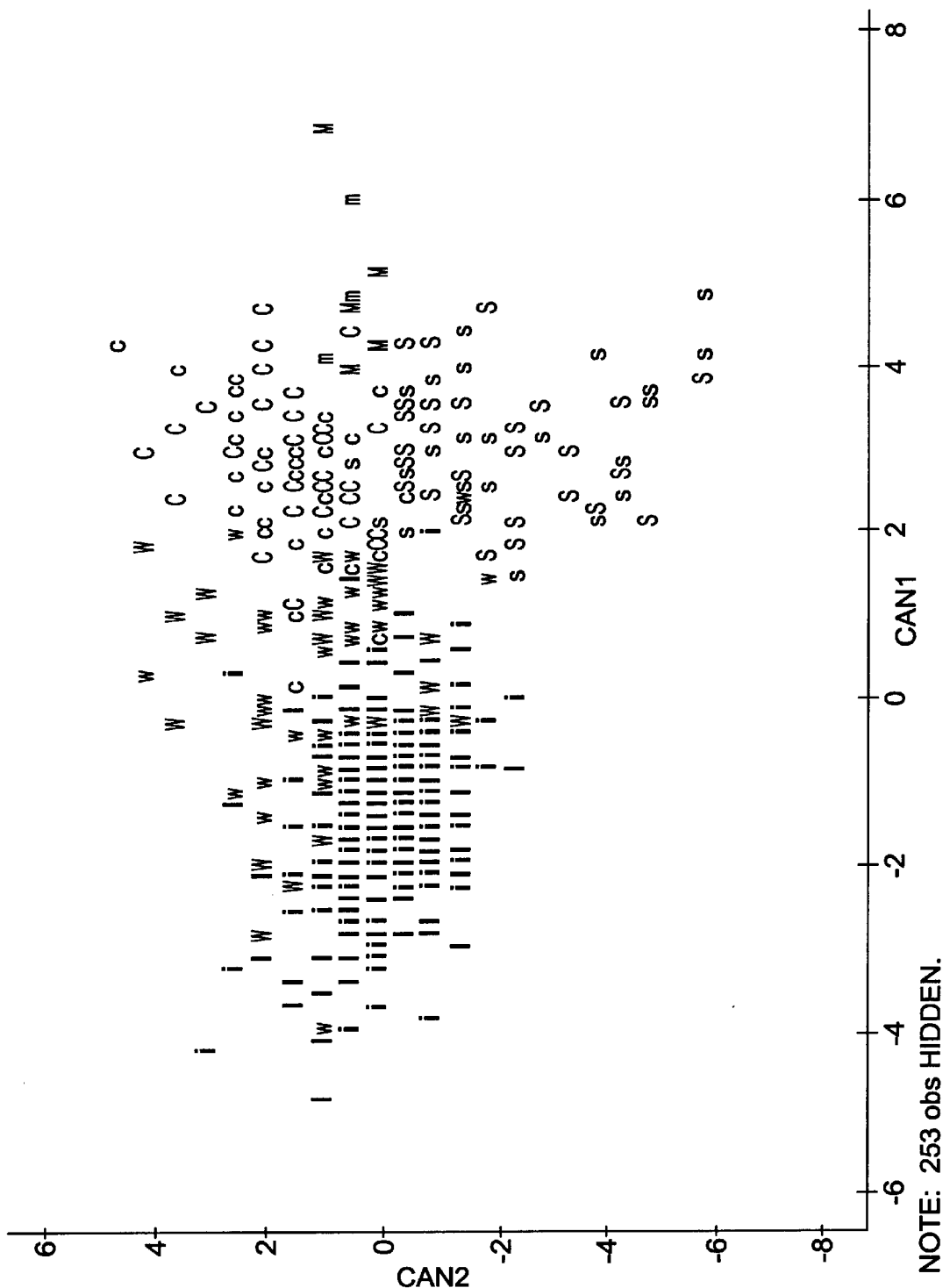
FIG. 9 plots the remaining data of FIG. 8 with respect to the canonical variables generated.

CDA was first applied to the data using two defined classes, Idaho and non-Idaho. FIG. 5 shows a frequency chart of the data using the first canonical variable. Classes were also defined by state (and one class for Canadian (CAN) samples). The data are plotted using the first two canonical variables in FIG. 6. In this two-dimensional projection CO and ID tend to overlap significantly and WI and ME display significant overlap. FIG. 7 is a "cleaner" view without the CO and ME samples. In FIG. 8 half the data (without CO or ME) were used to generate the canonical variables and then plotted, and, in FIG. 9, the remaining data (lower-case letters) are plotted with respect to the canonical variables generated by the data in FIG. 8. FIG. 9 thus conveys a visual sense of the consistency and the predictive properties of the data. We emphasize that any overlap depicted in one- or two-dimensional plots is not indicative of any intractable classification task. The predictive pattern recognition methods discussed below utilize all 14 available dimensions, and excellent predictive results are demonstrated.

Discriminant Function Analysis

The DISCRIM procedure was used for both parametric and non-parametric discriminant function analyses. The parametric procedure determines a discriminant function of classification criterion by a measure of generalized squared distance (Rao, 1973). This procedure assumes a multivariate normal distribution. Selection of variables to be included is discussed below. In this case, the classification criterion was based on an individual within-group covariance matrix, yielding a quadratic function. There was no difference in the classification of samples when either equal or prior probabilities of the groups were used (data not shown). Two error rates are computed. The first is an estimate of the probability of misclassification of future samples using the discriminant function created by the entire training set (n=608). The second is the error rate incurred during a cross-validation step, in which each sample is removed from the training set and tested against the resultant discriminant function created by the remaining samples (n=607). In all cases, the error rates given are those from the cross-validation test. Validation of the discriminant function was also conducted by withholding one-half of the samples from the training set and using them as a test set against the discriminant function created by the remaining 304 samples. This was then repeated in reverse. The non-parametric procedure used was the k-nearest-neighbor method, where k=10. As no assumption is made in this procedure regarding the nature of the data set, all variables were included.

The addition of V values to the parametric discriminant function, generated with the 15 remaining elements, increased the number of misclassified samples and was therefore removed from the analyses. Elimination of either Cr or Ni values reduced the number of misclassified samples and therefore these variables were included in the model. The final model included 14 elements (Baa, Ca, Cd, Cr, Cu, Fe, K, Mg, Mn, Ni, P, S, Sr, and Zn). The error rates of the quadratic discriminant function calculated using 14 element concentrations of 342 known Idaho potato samples and 266 known non-Idaho potato samples were 3.5% and 5.6%, respectively, resulting in 330 Idaho (97%) and 251 non-Idaho (95%) correctly classified samples in cross-validation testing (Table 4). The data set was randomly divided into two halves of 304 samples. Cross-validation testing using only 304 samples as the calibration or training set had error rates of 4.1 and 4.7% for known Idaho potatoes and 4.5 and 9.3% for non-Idaho potatoes (Table 4). Wherein the remaining database of known samples were used as a testing set against the 304 potato training set, error rates were 4.7% for the Idaho potatoes and 3.8 to 6.0% for non-Idaho potatoes (Table 4). The non-parametric K nearest-neighbor analyses using all 18 variables and all 608 samples gave low error rates for Idaho potatoes (1.2%) but had higher error rates for non-Idaho potatoes (8.4%).

TABLE 4

Parametric Discriminant Function Analysis of Elemental Concentrations of Potatoes

| Training Set | Test Set | Error Rates for Idaho | Error Rates for Non-Idaho |
| --- | --- | --- | --- |
| Entire database n = 608 | Cross-validation | 3.5% (12/342) | 5.6% (15/256) |
| Half (#1 of database n = 304 | Cross-validation Remaining database (n = 304) | 4.7% (8/171) 4.7% (8/171) | 4.5% (6/133) 6.0% (8/1333) |
| Half (#2) of database n = 304 | Cross-validation Remaining database (n = 304) | 4.1% (7/171) 4.7% (8/171) | 9.3% (11/133) 3.8% (5/133) |

Neural Network Analysis

Feed-forward back propagation neural network methods were also applied to the data in an effort to classify the samples by geographic origin as Idaho or non-Idaho samples. To prevent over-fitting or over-training, an early sopping strategy was employed to enhance the ability of the networks to generalize well (perform well on new data). The data were divided into two disjoint subsets: a training set and a test set. Networks were trained using half of the data (training set) During the training process the remaining half of the data (test set) was periodically presented to the networks for classification. The final values of the network parameters were those corresponding to optimum test set performance. Further generalization enhancements are possible by employing a bootstrap aggregating ("bagging") strategy (Frieman). Here multiple networks are trained using randomly selected (sampling with replacement) training sets corresponding to half the data. Final classification is then determined by voting. This has the effect of reducing the high variance inherent to neural networks, resulting in improved generalization.

Originally all 18 candidate trace metals were considered. It was found that superior classification results were obtained by considering only the 14 trace metals used in the parametric discriminant function analysis. This is most likely attributable to the fact that for a large number of samples, the measured quantities of the 4 unused trace metals were below detection limits, resulting in artificially truncated frequency distributions for these metals.

An early stopping strategy was first examined. Fifty neural network models were generated. Each model used 50% (304 samples) of the data for the training set and 50% for the test set. The model architecture was the same for each model; the difference in the models was due to the difference in training and test sets, which were selected randomly (as disjoint complements) for each model. Individual model classification performance on the known data (training and validation sets together) ranged from 92 to 98%.

To investigate a bagging strategy a universal test set of 46 samples was selected from the original data and set aside. This universal test set was selected so as to represent a typical cross-section of the original data. Sixty neural network models were then generated using the remaining data (562 samples), which was now considered as the "known" data set. As before, each individual model was generated using 50% (281 randomly selected samples) of the "known" data for training, and the remaining complementary set was used as a test set. Individual model performance ranged from 92–98% correctly classified on the "known" data (training and test sets together) and 89–98% on the universal test set. Generally, the relative performance of individual models on the "known" data and the universal test set were not strongly correlated. When the 60 independent classifiers were combined ("bagged"), the resulting aggregate model correctly classified 98% of the universal test set samples, missing only one out of the 50 samples. Also when the aggregate model was applied to the "known" data set, over 99% of the samples were correctly classified.

In order to compare the best neural network strategy (bagging) and the optimized parametric discriminate function analysis, the universal test set (46 samples) was removed and parametric discriminate functions were generated using the remaining data. The discriminant function analysis correctly classified 89% of the universal test set (41 out of 46 samples) and 95–96% of the known data set (562 samples) in cross-validation testing. Therefore, neural network bagging does appear to be worthwhile strategy, producing superior results over single model discriminant analysis.

It may be appreciated by one skilled in the art that additional embodiments may be contemplated, including similar systems and methods for localizing the geographic origin of virtually any plant or portion thereof that has the ability to take up substances from the soil in which it is grown. Extrapolations are also visualized wherein animal products could also be so localized dependent upon their feed source.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for detecting a geographical origin of a fresh commodity comprising the steps of:

generating a plurality of neural network models, each having as a training set a data set from a plurality of samples of a commodity of known origins analyzed for a plurality of elemental concentrations;

presenting to each neural network model for classification a test data set from a plurality of samples of a commodity of unknown origins analyzed for the plurality of elemental concentrations;

employing a bootstrap aggregating strategy to combine the results of the classifications for each sample in the test data set made by each neural network model; and determining from the bootstrap aggregating strategy a final classification of each sample in the test data set indicative of a geographical origin of the commodity.

2. The method recited in claim 1, wherein the test set and the training set comprise approximately equal-sized sets.

3. The method recited in claim 1, wherein the bootstrap aggregating strategy employing step and the final classification determining step comprise polling the classification results and selecting a classification value having a majority in the polling results as the final classification.

4. The method recited in claim 3, wherein the spectrometry performing step comprises determining concentrations of a plurality of trace elements.

5. The method recited in claim 4, wherein the plurality of trace elements comprise trace metals.

6. The method recited in claim 4, wherein the concentration determining step comprises normalizing for moisture content to reduce intersample variability.

7. The method recited in claim 1, wherein the sample analyzing step comprises the steps of:

liquefying at least a portion of each sample of the fresh commodity; and performing inductively coupled plasma atomic emission spectrometry on each liquefied commodity portion.

8. The method recited in claim 1, further comprising the step, prior to the generating step, of screening out elements from the test and the training sets having elemental concentrations below an experimental detection limit.

9. The method recited in claim 1, wherein the fresh commodity comprises potato.

10. The method recited in claim 9, wherein the elemental concentrations comprise concentrations of barium, cadmium, calcium, chromium, copper, iron, potassium, magnesium, manganese, nickel, phosphorus, sulfur, strontium, and zinc.

11. A system for detecting a geographical origin of a fresh commodity comprising:

at software means for generating a plurality of neural network models, each having means for receiving as a training set a data set from a plurality of samples of a commodity of known origins analyzed for a plurality of elemental concentrations;

means for presenting to each neural network model for classification a test data set from a plurality of samples of a commodity of unknown origins analyzed for the plurality of elemental concentrations;

a bootstrap aggregating software routine for combining the results of the classifications for each sample in the test data set made by each neural network model; and a poller for determining from the bootstrap aggregating strategy a final classification of each sample in the test data set indicative of a geographical origin of the commodity.

12. The system recited in claim 11, further comprising means for generating the test data set and the training data set.

13. The system recited in claim 12, wherein the means for generating the test data set and the training data set comprise a trace element analyzing system.

14. The system recited in claim 13, wherein the trace element analyzing system comprises an inductively coupled plasma atomic emission spectrometer.

15. A method for detecting a geographic origin of a fresh potato comprising the steps of:

collecting a chemical composition profile of a sample of a fresh potato of unknown origin;

comparing the profile with a data set comprising a plurality of chemical composition profiles collected from samples of fresh potatoes of known origin; and determining from the comparison a likely origin of the sample of unknown origin.

16. The method recited in claim 15, wherein the chemical composition profile comprises a trace element analysis.

17. The method recited in claim 16, wherein the trace element analysis includes at least one element selected from the group consisting of barium, chromium, copper, iron, manganese, and zinc.

18. The method recited in claim 16, wherein the trace element analysis includes a plurality of elements selected from the group consisting of barium, chromium, copper, iron, manganese, and zinc.

19. The method recited in claim 18, wherein the element group further consists of calcium, cadmium, potassium, magnesium nickel, phosphorus, sulfur, and strontium.

20. The method recited in claim 18, wherein the comparing step comprises employing a multivariate classification technique.

21. The method recited in claim 15, wherein the comparing and the determining steps comprise subjecting the profile to a multivariate pattern recognition algorithm.

22. The method recited in claim 21, wherein the subjecting step further comprises applying an artificial neural network to the profile.

23. The method recited in claim 22, wherein the neural network comprises a feed-forward back-propagation neural network.

24. A system for analyzing a geographic origin of a fresh potato comprising:

means for collecting a first trace element profile of a sample of fresh potato of unknown origin;

a second trace element profile for a sample of a fresh potato of known origin;

means for comparing the first trace element profile with the second trace element profile; and means for determining from the comparing means whether a geographic origin of the unknown sample is likely to be the same as the known origin.

25. The system recited in claim 24, wherein:

the second trace element profile comprises a dataset of a plurality of trace element profiles;

the comparing means comprises means for comparing the first trace element profile with each of the dataset profiles; and the determining means comprises means for determining which of the dataset profiles most closely matches the first trace element profile.

\* \* \* \* \*